(12) United States Patent
Ono et al.

(10) Patent No.: US 6,523,115 B1
(45) Date of Patent: Feb. 18, 2003

(54) ENCRYPTION DEVICE, DECRYPTION DEVICE, ENCRYPTION METHOD, DECRYPTION METHOD, CRYPTOGRAPHY SYSTEM, COMPUTER-READABLE RECORDING MEDIUM STORING ENCRYPTION PROGRAM, AND COMPUTER-READABLE RECORDING MEDIUM STORING DECRYPTION PROGRAM WHICH PERFORM ERROR DIAGNOSIS

(75) Inventors: Takatoshi Ono, Aichi-ken (JP); Takeshi Saijo, Obu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/250,804

(22) Filed: Feb. 17, 1999

(30) Foreign Application Priority Data

Feb. 18, 1998 (JP) .......................................... 10-036029

(51) Int. Cl.[7] ................................................. H04L 9/00
(52) U.S. Cl. ....................................... 713/181; 713/168
(58) Field of Search ................................ 713/181, 168, 713/160, 161; 380/255, 28, 29, 30, 282, 285

(56) References Cited

U.S. PATENT DOCUMENTS

| | | | | |
|---|---|---|---|---|
| 5,297,206 A | * | 3/1994 | Orton | .......................... 380/28 |
| 5,303,293 A | | 4/1994 | Bettenhausen | |
| 5,373,316 A | | 12/1994 | Ishinabe et al. | |
| 6,044,463 A | * | 3/2000 | Kanda et al. | .................. 380/28 |

FOREIGN PATENT DOCUMENTS

JP 962596 3/1997

\* cited by examiner

Primary Examiner—Matthew Smithers

(57) ABSTRACT

In a cryptography system, plaintext storage unit 101 stores a plaintext. Encryption unit 102 encrypts the plaintext to generate a ciphertext. First verification data generating unit 104 generates first verification data, and second verification data generating unit 106 generates second verification data. Decryption unit 114 decrypts the ciphertext to generate a decrypted plaintext. First verification unit 116 performs verification using the decrypted plaintext and the first verification data. Second verification unit 117 performs verification using the first verification data, the ciphertext, and the second verification data. Display unit 112 displays the results of the verifications.

34 Claims, 12 Drawing Sheets

FIG. 7

611 BROADCAST GROUP TABLE

| BROADCAST GROUP IDs | DESTINATION IDs |
|---|---|
| GROUP A | RECIPIENT A |
| | RECIPIENT B |
| | RECIPIENT C |
| | RECIPIENT D |
| GROUP B | RECIPIENT D |
| | RECIPIENT E |
| | RECIPIENT F |
| ⋮ | ⋮ |

<DIGEST ajSgapgiSjDSlga>

AnjElg+lsjOkeawpGkesuil

<ENC−SIGN asgeSjEoSLgeosS−eL>

FIRST VERIFICATION FAILS.
WRONG KEY WAS POSSIBLY USED FOR DECRYPTION.
CHECKING REQUIRED.

SECOND VERIFICATION FAILS.
RECEIVED DATA MIGHT HAVE BEEN CHANGED DURING TRANSMISSION ON COMMUNICATION LINES.
APPROPRIATE REMEDY NEEDED.

FIG. 16

| A | B | C | E | X | Y |
|---|---|---|---|---|---|
| ○ | ○ | ○ | ○ | ○ | ○ |
| × | ○ | ○ | ○ | × | × |
| ○ | × | ○ | ○ | × | × |
| × | × | ○ | ○ | × | × |
| ○ | ○ | × | ○ | ○ | × |
| × | ○ | × | ○ | × | × |
| ○ | × | × | ○ | × | × |
| × | × | × | ○ | × | × |
| ○ | ○ | ○ | × | × | ○ |
| × | ○ | ○ | × | × | × |
| ○ | × | ○ | × | × | × |
| × | × | ○ | × | × | × |
| ○ | ○ | × | × | × | × |
| × | ○ | × | × | × | × |
| ○ | × | × | × | × | × |
| × | × | × | × | × | × |

ERROR CAUSES   A: FIRST VERIFICATION DATA
                     B: CIPHERTEXT
                     C: SECOND VERIFICATION DATA
                     E: SECRET KEY FOR DECRYPTION
VERIFICATION RESULTS   X: FIRST VERIFICATION
                               Y: SECOND VERIFICATION

| ERROR CAUSES | | | | VERIFICATION RESULTS | |
|---|---|---|---|---|---|
| A | B | C | E | X | Y |
| ○ | ○ | ○ | ○ | ○ | ○ |
| ○ | × | ○ | ○ | × | × |
| ○ | ○ | ○ | × | × | ○ |
| ○ | × | ○ | × | × | × |

ERROR CAUSES  A: FIRST VERIFICATION DATA
B: CIPHERTEXT
C: SECOND VERIFICATION DATA
E: SECRET KEY FOR DECRYPTION
VERIFICATION RESULTS  X: FIRST VERIFICATION
Y: SECOND VERIFICATION

ENCRYPTION DEVICE, DECRYPTION DEVICE, ENCRYPTION METHOD, DECRYPTION METHOD, CRYPTOGRAPHY SYSTEM, COMPUTER-READABLE RECORDING MEDIUM STORING ENCRYPTION PROGRAM, AND COMPUTER-READABLE RECORDING MEDIUM STORING DECRYPTION PROGRAM WHICH PERFORM ERROR DIAGNOSIS

This application is based on application No. 10-036029 filed in Japan, the content of which is hereby incorporated by reference.

BACKGROUND OF THE INVENTION

1. Field of the Invention

The present invention relates to cryptography techniques, especially a correctness verification technique for decrypted data, that are used in secret communication.

2. Description of the Related Art

Cryptographic techniques are used as one way to transmit important information securely without the information reaching third parties. Such techniques are used, for example, by e-mail (electronic mail) encryption systems that have broadcast functions, in which e-mail messages are encrypted and sent to a plurality of recipients.

The following describes, with reference to FIG. 1, the operation of an example e-mail encryption system that has a broadcast function, Mail sender 1501 encrypts message 1531 written in a plaintext form using public key 1521 to generate a ciphertext. The generated ciphertext is sent to mail recipients 1502–1505 in mail recipient group 1541. Mail recipients 1502–1505 then decrypt the received ciphertext using secret key 1523 to obtain the message in the plaintext form.

Mail sender 1501 also encrypts another message 1532 using another public key 1522 to generate another ciphertext. The generated ciphertext is sent to mail recipients 1505–1507 in another mail recipient group 1542. Mail recipients 1505–1507 then decrypt the received ciphertext using another secret key 1524 to obtain the message in the plaintext form.

Encrypted communication is generally achieved thorough the following steps: (a) encryption of a plaintext, (b) transmission of a ciphertext and other data, (c) decryption of the ciphertext, and (d) verification of a decrypted plaintext.

In the above e-mail encryption system, a message addressed to a plurality of recipients is encrypted once to generate a single ciphertext that is broadcast to the recipients. However, should mail recipient 1505 mistakenly use secret key 1524, instead of secret key 1523, to decrypt a message that has been encrypted with public key 1521, the encrypted message will not be correctly decrypted. In other cases, errors during transmission can result in a partial loss of the ciphertext or in mistransmission of its content. Here also, the encrypted message will not be correctly decrypted. In this way, a mail recipient having two or more secret keys can't know, whether a failure to correctly decrypt a ciphertext is due to the use of the wrong secret key or an error during transmission.

SUMMARY OF THE INVENTION

In view of the above problem, the present invention aims to provide an encryption device, a decryption device, an encryption method, a decryption method, a cryptography system, a computer-readable recording medium that stores an encryption program, and a computer-readable recording medium that stores a decryption program, wherein verification data is generated with which it can be verified, when a ciphertext is not correctly decrypted, whether encrypted communication has been performed without errors up to the step of "(b) transmission of a ciphertext and other data" in the steps (a)–(d) for encrypted communication that are described above.

The encryption device encrypts a plaintext to generate a ciphertext and outputs the ciphertext to a decryption device, the encryption device including: a plaintext storage unit for storing a plaintext; a first generating unit for generating first verification data by performing a first message digest algorithm for the plaintext, the plaintext having been read from the plaintext storage unit; an encryption unit for encrypting the plaintext using a predetermined encryption algorithm to generate a ciphertext, the plaintext having been read from the plaintext storage unit; a second generating unit for generating second verification data by performing a second message digest algorithm for a combination of the first verification data and the ciphertext; and a data outputting unit for outputting the ciphertext, the first verification data, and the second verification data to the decryption device.

With the construction of this encryption device, the first verification data is generated by performing the first message digest algorithm for the plaintext, and the second verification data is generated by performing the second message digest algorithm for the combination of the first verification data and the ciphertext. As a result, the encryption device can send to the decryption device information with which it can be verified, when the ciphertext is not correctly decrypted by the decryption device, whether encrypted communication has been performed without errors up to the step of "(b) transmission of a ciphertext and other data" in the steps (a)–(d) for encrypted communication.

Here, the first generating Unit may include a digital signature generation algorithm in addition to the first message digest algorithm and generate first verification data by performing the first message digest algorithm for the plaintext to produce a message digest and then performing the digital signature generation algorithm for the message digest.

With the construction of the above encryption device, the first verification data is generated by performing the digital signature generation for the message digest generated by performing the first message digest algorithm, and the second verification data is generated by performing the second message digest algorithm for the combination of the first verification data and the ciphertext. As a result, this encryption device has an advantage of being able to send to the decryption device information that the decryption device can use to confirm the sender of a message, in addition to the advantage, which was described earlier, of being able to send verification information Here, the second generating unit may have a digital signature generation algorithm in addition to the second message digest algorithm and generate second verification data by performing the second message digest algorithm for the combination of the first verification data and the ciphertext to produce a message digest and then performing the digital signature generation algorithm for the message digest.

With the construction of this encryption device, the first verification data is generated by performing the first message digest algorithm, and the second verification data is generated by performing the digital signature generation for the message digest generated by performing the second message digest algorithm for the combination of the first verification data and the ciphertext. As a result, this encryption device has an advantage of being able to send information that the decryption device can use to confirm the sender of a message, in addition to the advantage, which was described earlier, of being able to send verification information.

The encryption device encrypts a plaintext to generate a ciphertext and outputs the ciphertext to a decryption device, the encryption device including: a plaintext storage unit for storing a plaintext; a first generating unit for generating first verification data by performing a first message digest algorithm for the plaintext, the plaintext having been read from the plaintext storage unit; an encryption unit for encrypting the plaintext using a predetermined encryption algorithm to generate a ciphertext, the plaintext having been read from the plaintext storage unit; a second generating unit for generating second verification data by performing a second message digest algorithm for the ciphertext; and a data outputting unit for outputting the ciphertext, the first verification data, and the second verification data to the decryption device.

For the construction of this encryption device, the first verification data is generated by performing the first message digest algorithm for the plaintext, and the second verification data is generated by performing the second message digest algorithm for the ciphertext. Since data sizes of the first verification data and the second verification data are much smaller than the ciphertext and so the first verification data and the second verification data can be assumed to include no errors, the encryption device can send to the decryption device information showing that the wrong secret key was used for decryption when the verification of the first verification unit fails whereas that of the second verification unit succeeds, or that an error has occurred for the ciphertext when the verifications of both first verification unit and second verification unit fail.

Here, the second generating unit may have a digital signature generation algorithm in addition to the second message digest algorithm and generate second verification data by performing the second message digest algorithm for the ciphertext to produce a message digest and then performing the digital signature generation algorithm for the message digest.

With the construction of this encryption device, the first verification data is generated by performing the first message digest algorithm for the plaintext, and the second verification data is generated by performing the second message digest algorithm for the ciphertext to generate the message digest and then performing a digital signature generation for the generate message digest to generate the second verification data. As a result, this encryption device has an advantage of being able to send information that the decryption device can use to confirm the sender of a message in addition to information showing that the wrong secret key was used for decryption when the verification of the first verification unit fails whereas that of the second verification unit succeeds, or that an error has occurred for the ciphertext when the verifications of both first verification unit and the second verification unit fail, since data sizes of the first verification data and the second verification data are much smaller than the ciphertext and so the first verification data and the second verification data can be assumed to include no error.

The above object may be also achieved by the device decrypting a ciphertext outputted from an encryption device, the decryption device including: a data receiving unit for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for a combination of the first verification data and the ciphertext; a decryption unit for decrypting the received ciphertext using a decryption algorithm that decrypts ciphertexts encrypted by the predetermined encryption algorithm to generate a decrypted plaintext; a first generating unit for generating third verification data by performing an algorithm corresponding to the first message digest algorithm for the decrypted plaintext; a first verification unit for verifying the received first verification data using the third verification data; a second generating unit for generating fourth verification data by performing an algorithm corresponding to the second message digest algorithm for a combination of the received first verification data and the received ciphertext; a second verification unit for verifying the received second verification data using the fourth verification data; and an outputting unit for outputting results of the first verification unit and the second verification unit.

With the construction of this decryption device, it can be verified, when the ciphertext is not decrypted correctly, whether encrypted communication has been performed without errors up to the step of "(b) transmission of a ciphertext and other data" in the steps (a)–(d) to encrypted communication, using the first verification data and the second verification data outputted from the encryption device, Here, the first verification unit may verify the received first verification data using the third verification data according to a digital signature verification algorithm that verifies a signature made by a digital signature generation algorithm, wherein the first verification data may be generated by performing the first message digest algorithm for the plaintext to produce a message digest and then performing the digital signature generation algorithm for the message digest.

For the construction of this decryption device, the user is able to confirm the sender of a message as well as know, when the ciphertext is not correctly decrypted, whether encrypted communication has been performed without errors up to the step of "(b) transmission of a ciphertext and other data" in the steps (a)–(d) for encrypted communication, using the first verification data and the second verification data outputted from the encryption device.

Here, the second verification unit may verify the received second verification data using the fourth verification data according to a digital signature verification algorithm that verifies a signature made by a digital signature generation algorithm and wherein the second verification data is generated by performing the second message digest algorithm for the combination of the first verification data and the ciphertext to produce a message digest and then performing the digital signature generation algorithm for the message digest.

For the construction of this decryption device, the user is able to confirm the sender of a message as well as to know, when the ciphertext is not correctly decrypted, whether encrypted communication has been performed without errors up to the step of "(b) transmission of a ciphertext and other data" in the steps (a)–(d) for encrypted communication, using the first verification data and the second verification data outputted from the encryption device.

The above object may be also achieved by the decryption device decrypting a ciphertext outputted from an encryption device, the decryption device including: a data receiving unit for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for the ciphertext; a decryption unit for decrypting the received ciphertext using a decryption algorithm that decrypts ciphertexts encrypted by the predetermined encryption algorithm to generate a decrypted plaintext; a first generating unit for generating third verification data by performing an algorithm corresponding to the first message digest algorithm for the decrypted plaintext; a first verification unit for verifying the received first verification data using the third verification data; a second generating unit for generating fourth verification data by performing an algorithm corresponding to the second message digest algorithm for the received ciphertext; a second verification unit for verifying the received second verification data using the fourth verification data; and an outputting unit for outputting results of the first verification unit and the second verification unit.

With the construction of this decryption device, when the ciphertext is not decrypted correctly, the user can know that the wrong secret key was used for decryption when the verification of the first verification unit fails whereas that of the second verification unit succeeds, or that an error has occurred for the ciphertext when the verifications of both first verification unit and second verification unit fail. This is because data sizes of the first verification data and the second verification data are much smaller than the ciphertext, and so the first verification data and the second verification data can be assumed to include no error.

The above object may be also achieved by the decryption device decrypting a ciphertext outputted from an encryption device, the decryption device including: a data receiving unit for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for the ciphertext to produce a message digest and then performing a digital signature generation algorithm for the message digest; a decryption unit for decrypting the received ciphertext using a decryption algorithm that decrypts ciphertexts encrypted by the predetermined encryption algorithm to generate a decrypted plaintext; a first generating unit for generating third verification data by performing an algorithm corresponding to the first message digest algorithm for the decrypted plaintext; a first verification unit for verifying the received first verification data using the third verification data; a second generating unit for generating fourth verification data by performing an algorithm corresponding to the second message digest algorithm for the received ciphertext; a second verification unit for verifying the received second verification data using the fourth verification data according to a digital signature verification algorithm that verifies a signature made by the digital signature generation algorithm; and an outputting unit for outputting results of the first verification unit and the second verification unit.

With the construction of this decryption device, the user is able to confirm the sender of a message as well as know that the wrong secret key was used for decryption when the verification of the first verification unit fails whereas that of the second verification unit succeeds, or that an error has occurred for the ciphertext when the verifications of both first verification unit and second verification unit fail. This is because data sizes of the first verification data and the second verification data are much smaller than the ciphertext, and so the first verification data and the second verification data can be assumed to include no error.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 7 shows an example of a broadcast group table;

FIG. 8 shows an example of transmission data;

FIG. 12A shows a display screen example displayed by display unit;

FIG. 12B shows a display screen example displayed by display unit;

FIG. 16 shows relations between error causes and verification results of the e-mail encryption system shown in FIG. 2;

FIG. 17 shows a data flow of an e-mail encryption system in Modification-1; and

FIG. 18 shows relations between error causes and verification results of the e-mail encryption system in Modification-1.

DESCRIPTION OF THE PREFERRED EMBODIMENT

As an embodiment of the present invention, the following explains e-mail encryption system 120 that has a broadcast function.

[Construction of E-mail Encryption System 120]

Figure 1:
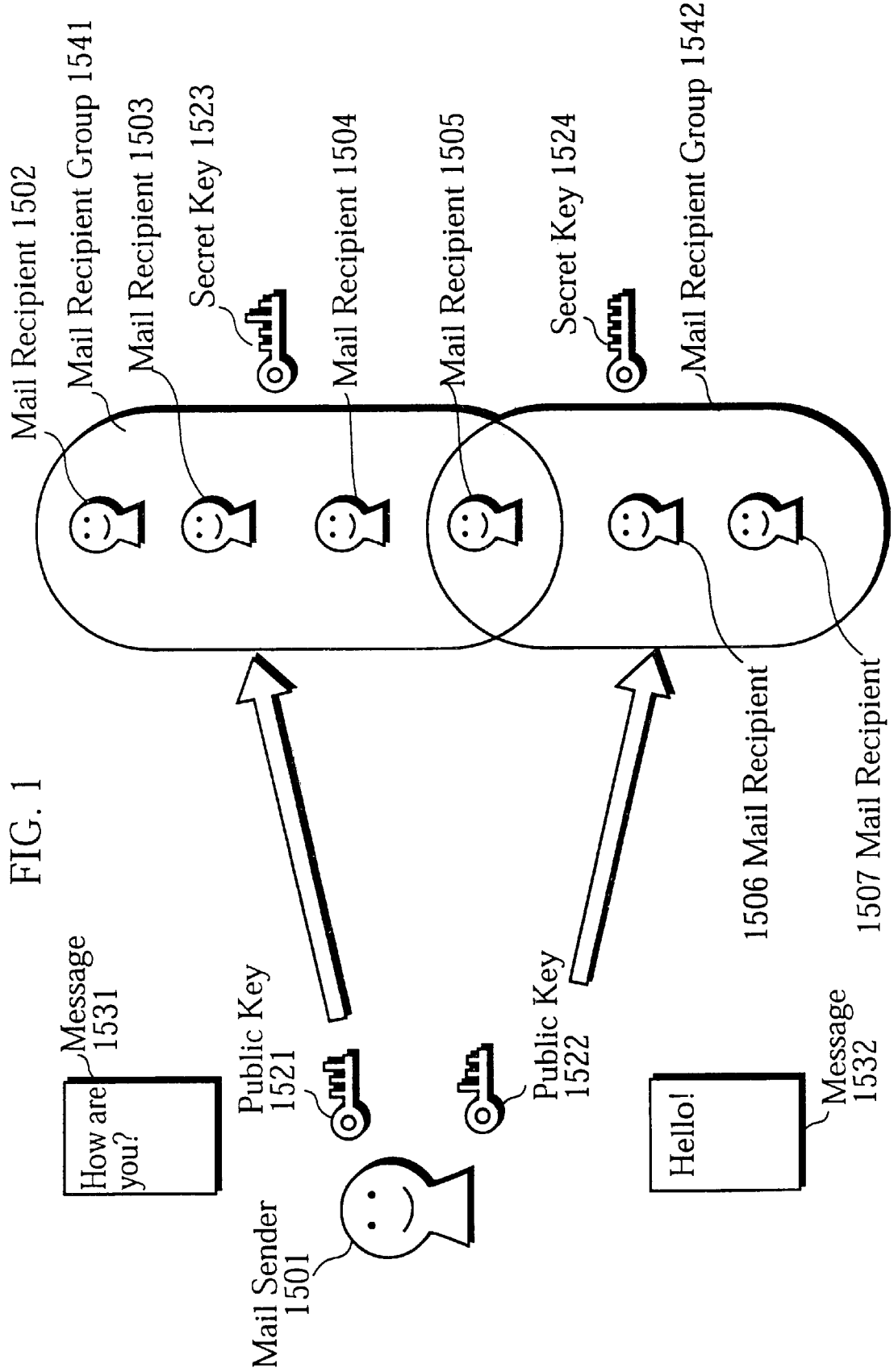
FIG. 1 shows the operation of a conventional e-mail encryption system as an example.
Figure 2:
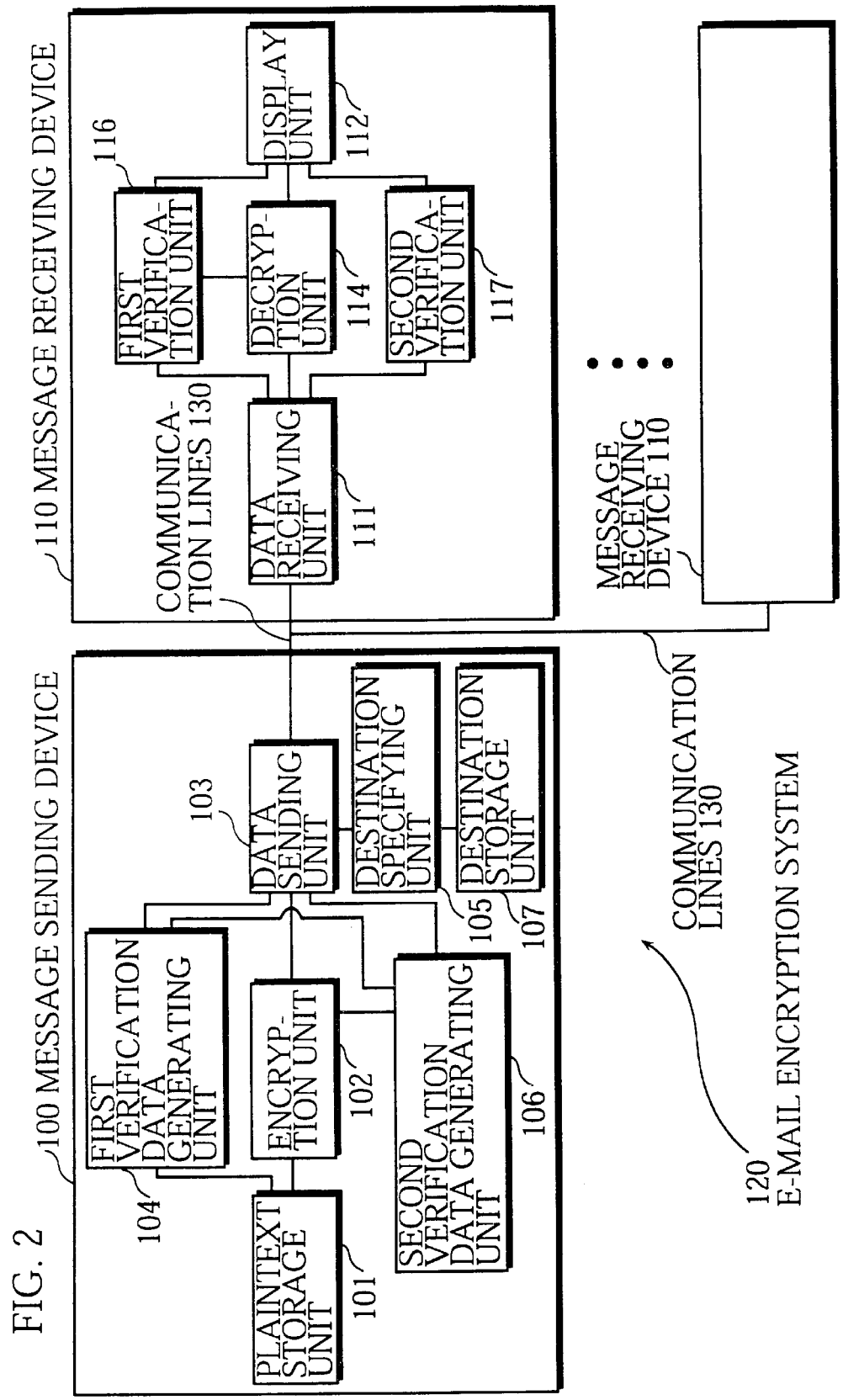
FIG. 2 is a block diagram of an e-mail encryption system in an embodiment of the present invention.

FIG. 2 is a block diagram that shows the construction of e-mail encryption system 120.

E-mail encryption system 120 comprises one message sending device 100 and a plurality of message receiving devices 110.

Message sending device 100 comprises plaintext storage unit 101, encryption unit 102, first verification data generating unit 104, second verification data generating unit 106, destination specifying unit 105, destination storage unit 107, and data sending unit 103 that is connected to communication lines 130. Each message receiving device 110 comprises data receiving unit 111 that is connected to communication lines 130, decryption unit 114, first verification unit 116, second verification unit 117, and display unit 112.

Figure 3:
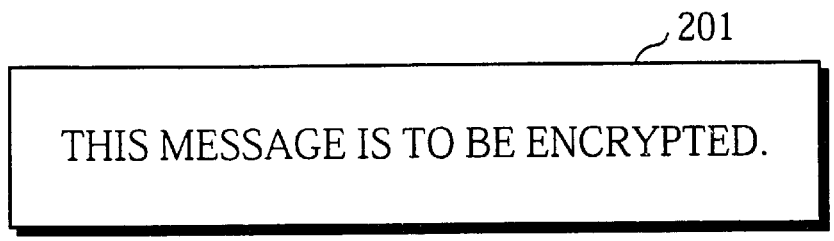
FIG. 3 shows an example of a plaintext.

Plaintext storage unit 101 stores at least one e-mail text that may include confidential information and is written in the form of plaintext before encryption. FIG. 3 shows plaintext 201 as an example of the stored plaintext.

Figure 4:
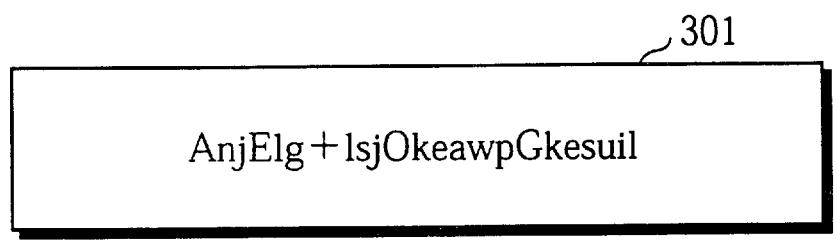
FIG. 4 shows an example of a ciphertext.

Encryption unit 102 reads plaintext 201 from plaintext storage unit 101 and encrypts plaintext 201 using a predetermined public key and a predetermined encryption algorithm to generate a ciphertext. The predetermined public key used here is generated corresponding to a secret key used in decryption unit 114 and is provided to encryption unit 102 in advance. The secret key will be referred to later. FIG. 4 shows ciphertext 301 as an example of the generated ciphertext. The generated ciphertext 301 is output to data sending unit 103 and second verification data generating unit 106.

First verification data generating unit 104 reads plaintext 201 from plaintext storage unit 101 and performs hashing for the read plaintext 201 using the hash function SHA-1 (Secure Hash Algorithm) to generate first verification data of a predetermined length. Here, the hash function SHA-1 is widely known and so will not be described. The generated first verification data is generally called a message digest, which refers to data of a predetermined length that has been generated by an operation that reduces data of any length to the predetermined length. This operation that creates a message digest is itself sometimes called a message digest. Here, hashing refers to an operation that generates a message digest. In the following notation, h(D) denotes the message digest generated by hashing for data D. For data D of any length, hashing is an operation that generates the message digest h(D) wherein it is difficult in terms of computing complexity to find other data D' such that h(D')=h(D). Further explanation of hashing and message digests will be omitted as it is described in *Angou Riron Nyuumon* ("Introduction to Encryption Theory"), Eiji Okamoto, Kyouritsu Publishing, 1993.

Figure 5:
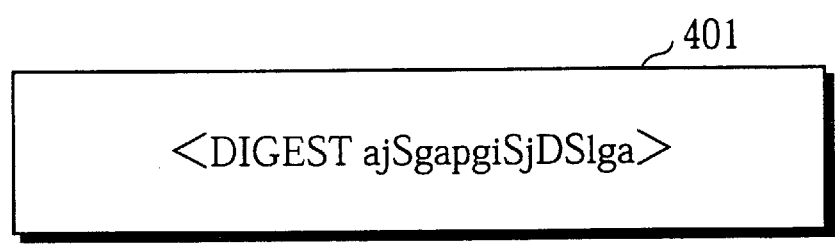
FIG. 5 shows an example of first verification data.

FIG. 5 shows first verification data 401 as an example of the generated first verification data. First verification data generating unit 104 outputs first verification data 401 to data sending unit 103 and second verification data generating unit 106.

Figure 6:
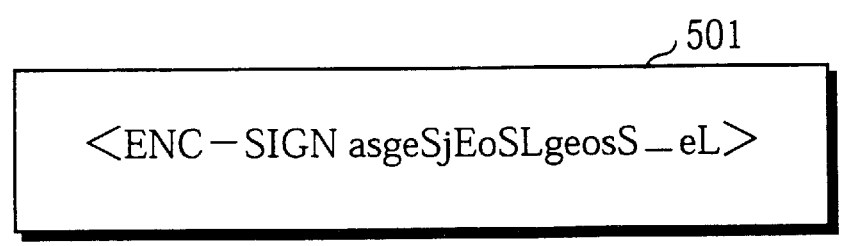
FIG. 6 shows an example of second verification data.

Second verification data generating unit 106 combines ciphertext 301 and first verification data 401 in the stated order. Second verification data generating unit 106 then performs hashing using the hash function SHA-1 for the combination of ciphertext 301 and first verification data 401 to generate 20-byte hash data. This processing by second verification data generating unit 106 for performing hashing using the hash function to generated the hash data is generally called the processing for message digest creation. The same hash function is used as in first verification data generating unit 104, although a different hash function may be used. Following this, the MYELLTY (MATSUSHITA elliptic curve cryptosystem) algorithm for signature generation is performed for the generated hash data using a predetermined secret key to generate second verification data. The MYELLTY algorithm is widely known and so will not be described. FIG. 6 shows second verification data 501 as an example of the generated second verification data.

Destination storage unit 107 stores broadcast group table 611 shown in FIG. 7.

Broadcast group table 611 is a data table that contains broadcast group IDs (identifiers) 621 and destination IDs 622, with each broadcast group ID associated with at least one destination ID. Broadcast group table 611 is used when identical messages need to be sent to a plurality of destinations in the same broadcast group. Broadcast group IDs 621 are identifiers that identify groups of a plurality of destinations to which a same message may be sent. Destination IDs 622 are identifiers that identify message receiving device 110 to which a message is to be sent. As least one destination ID 622 corresponds to each broadcast group ID 621.

Destination specifying unit 105 receives specification of a broadcast group from the user, and searches broadcast group table 611 for the corresponding broadcast group ID 621. Destination specifying unit 105 then extracts destination IDs 622 associated with the searched broadcast group ID 621 from broadcast group table 611, and outputs the extracted destination IDs 622 to data sending unit 103.

Data sending unit 103 combines first verification data 401, ciphertext 301, and second verification data 501 in the stated order, which have been output from first verification data generating unit 104, encryption unit 102, and second verification data generating unit 106, respectively to generate transmission data 601.

FIG. 8 shows transmission data 601 as an example. Data sending unit 103 also receives at least one destination ID 622 from destination specifying unit 105 and sends transmission data 601 to data receiving unit 111 of each message receiving device 110 specified by the destination IDS 622.

Figure 9:
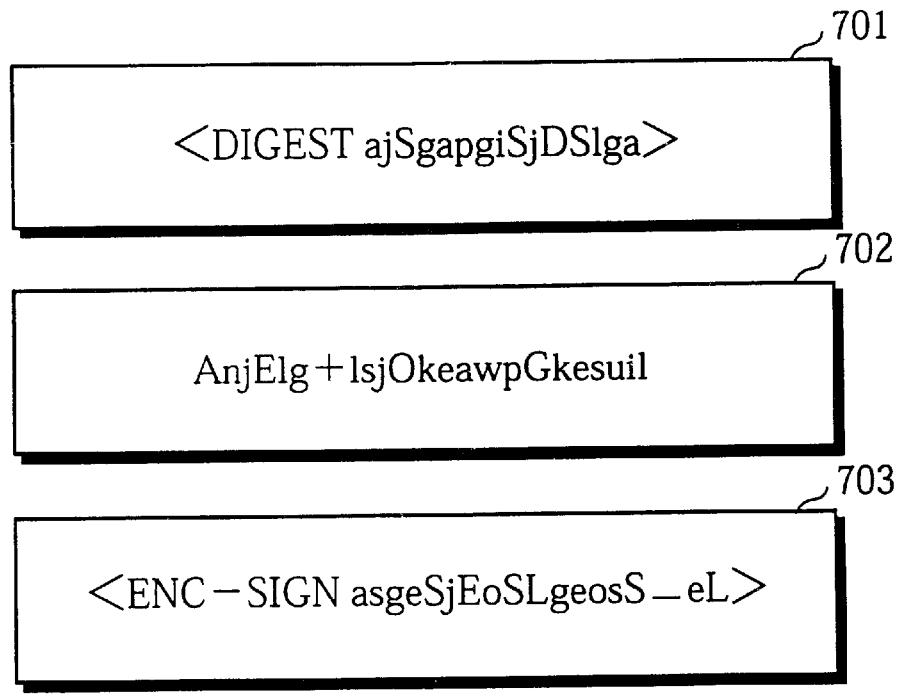
FIG. 9 shows examples of data each separated from transmission data.

Data receiving unit 111 receives transmission data 601 sent from data sending unit 103 and separates it into first verification data, ciphertext, and second verification data, examples of which are shown in FIG. 9 as first verification data 701, ciphertext 702, and second verification data 703. Following this, data receiving unit 111 outputs the separated ciphertext 702 to decryption unit 114, the separated first verification data 701 to first verification unit 116, and the separated first verification data 701, the separated ciphertext 702, and the separated second verification data 703 to second verification unit 117.

Figure 10:
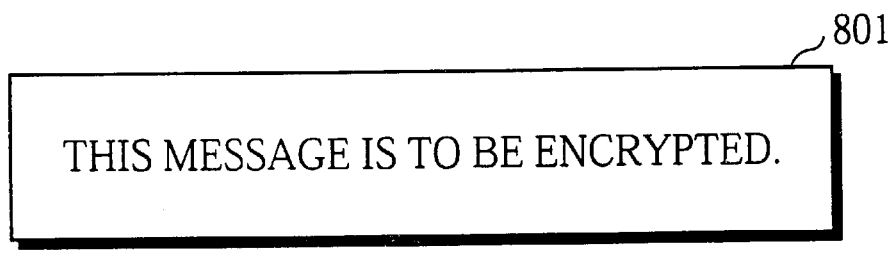
FIG. 10 shows an example of a decrypted plaintext obtained after decryption of a ciphertext.

Decryption unit 114 decrypts the separated ciphertext 702 using a predetermined encryption algorithm and the secret key corresponding to the public key used in encryption unit 102 to generate a decrypted plaintext. FIG. 10 shows decrypted plaintext 801 as an example. Here, if decryption has been performed correctly, decrypted plaintext 801 is the same as plaintext 201. Decryption unit 114 outputs decrypted plaintext 801 to display unit 112 and first verification unit 116.

Figure 11:
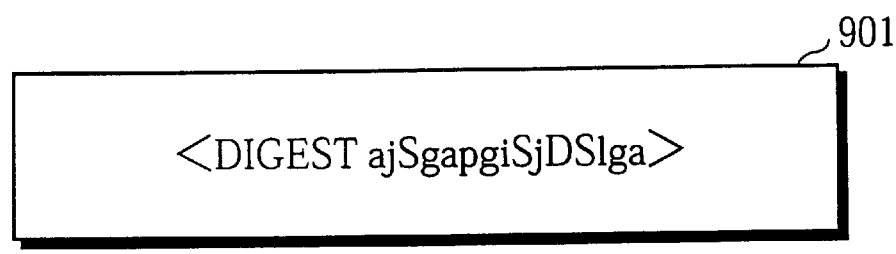
FIG. 11 shows an example of third verification data generated in first verification unit.

First verification unit 116 receives decrypted plaintext 801 outputted from decryption unit 114 and first verification data 701 outputted from data receiving unit 111. Following this, first verification unit 116 performs hashing for decrypted plaintext 801 using the hash function SHA-1, which was used in first verification data generating unit 104, to generate third verification data. This processing for performing hashing and then generating third verification data is called the processing for message digest creation. FIG. 11 shows third verification data 901 as an example of the generated third verification data. First verification unit 116 then compares the generated third verification data 901 with the received first verification data 701, and generates first verification result 1001 showing whether there is a match. First verification unit 116 then outputs first verification result 1001 to display unit 112.

Second verification unit 117 receives first verification data 701, ciphertext 702, and second verification data 703 that have been output from data receiving unit 111. Second verification unit 117 then combines ciphertext 702 and first verification data 701 in the stated order, and performs hashing for the combination of ciphertext 702 and first verification data 701 using the hash function SHA-1 that was used in second verification data generating unit 106. As a result, 20-byte hash data is generated. The processing by second verification unit 117 for performing hashing using the hash function and then generating the hash data is generally called the processing for message digest creation. Following this, second verification unit 117 verifies correctness of the received second verification data 703 by performing the MYELLTY signature verification algorithm using a predetermined public key, the generated hash data, and second verification data 703. Here, the public key corresponds to the secret key used in second verification data generating unit 106, and is provided in advance to second verification unit 117. Second verification unit 117 then generates second verification result 1002 showing whether second verification data 703 is correct, and outputs second verification result 1002 to display unit 112.

Display unit 112 receives decrypted plaintext 801, first verification result 1001, and second verification result 1002 that have been output from decryption unit 114, first verification unit 116, and second verification unit 117, respectively. Display unit 112 displays decrypted plaintext 801, if first verification result 1001 shows that there is a match and second verification result 1002 shows that second verification data 703 is correct. Display unit 112 displays a different indication showing that the received data might have been changed during transmission on communication lines if first verification result 1001 shows that there is a match and second verification result 1002 shows that second verification data 703 is incorrect. If first verification result 1001 shows that there is no match and second verification result 1002 shows that second verification data 703 is correct, then display unit 112 displays a different indication showing that the wrong key was possibly used for decryption. If first verification result 1001 shows that there is no match and second verification result 1002 shows that second verification data 703 is incorrect, then display unit 112 displays the indication showing that the received data might have been changed during transmission on communication lines. FIGS. 12A and 12B show display screen examples of these indications respectively showing that the wrong key was possibly used for decryption and that the received data might have been changed during transmission on communication lines.

[Processing of E-mail Encryption System 120]

Figure 13:
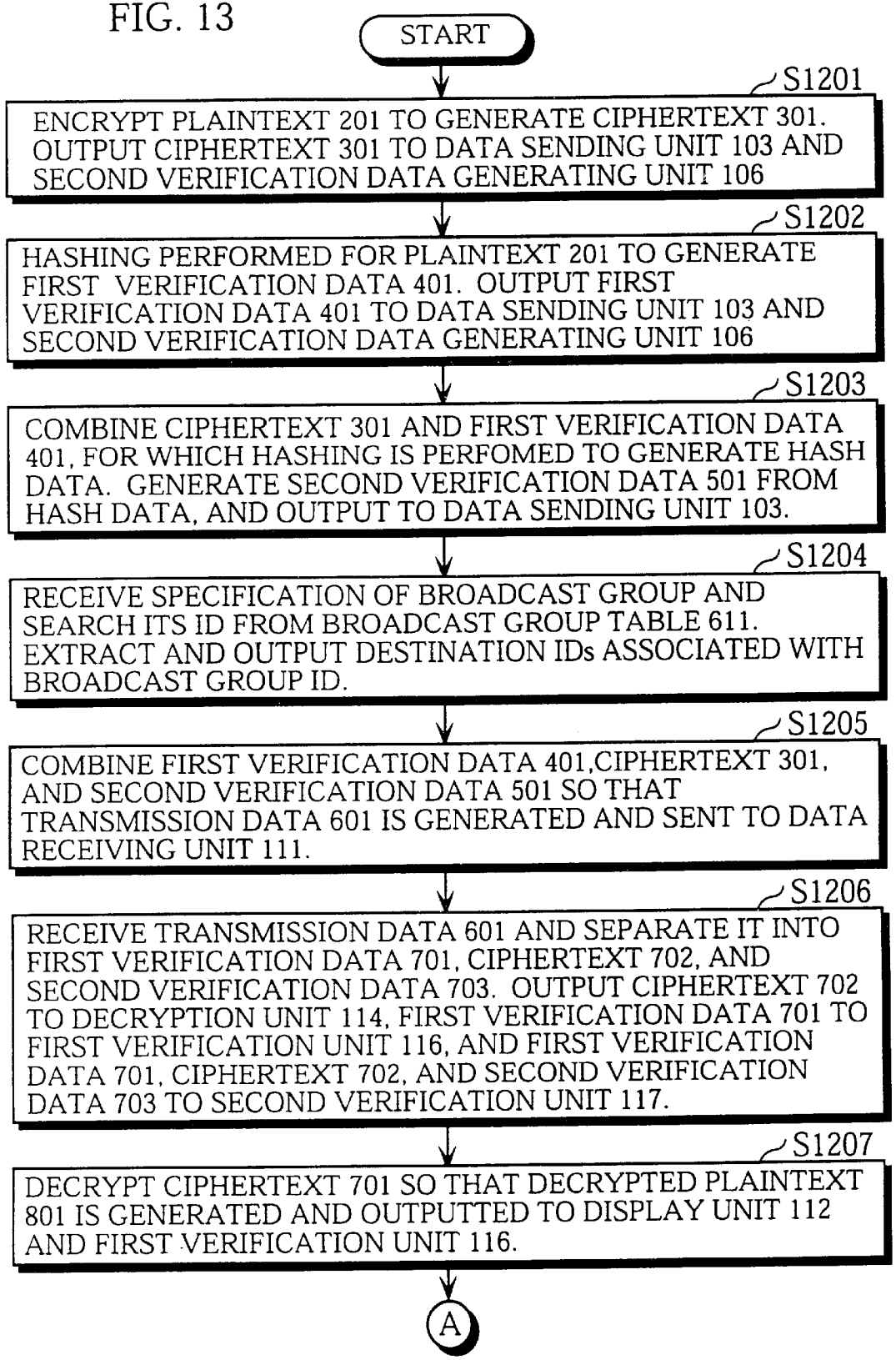
FIG. 13 is a flowchart showing the processing of the e-mail encryption system shown in FIG. 2.
Figure 14:
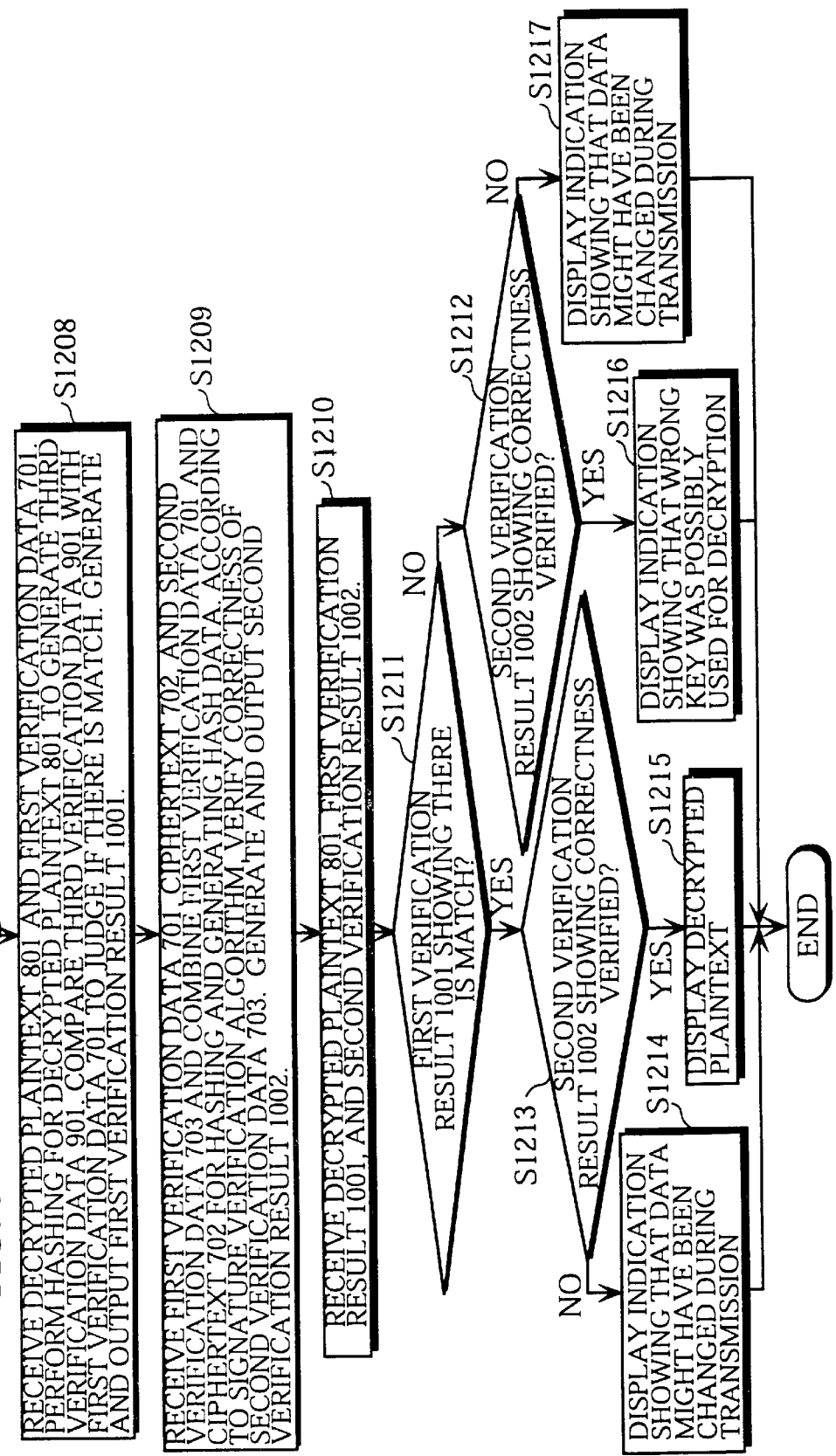
FIG. 14 is a flowchart that follows the flowchart of FIG. 13.

The following explains the processing of the e-mail encryption system 120 shown in FIG. 2, referring to flowcharts of FIGS. 13 and 14.

Encryption unit 102 reads plaintext 201 from plaintext storage unit 101, encrypts plaintext 201 using a predetermined public key and a predetermined encryption algorithm to generate ciphertext 301, and outputs generated ciphertext 301 to data sending unit 103 and second verification data generating unit 106 (Step S1201).

First verification data generating unit 104 reads plaintext 201 from plaintext storage unit 101 and performs hashing for the read plaintext 201 using the hash function SHA-1 to generate first verification data 401. First verification data generating unit 104 then outputs first verification data 401 to data sending unit 103 and second verification data generating unit 106 (Step S1202).

Second verification data generating unit 106 combines ciphertext 301 and first verification data 401, which have been respectively output from encryption unit 102 and first verification data generating unit 104, in the stated order. Following this, second verification data generating unit 106 performs hashing using the hash function SHA-1 for the combination of ciphertext 301 and first verification data 401 to generate 20-byte hash data. The MYELLTY signature generation algorithm is then performed for the generated hash data, using a predetermined secret key to generate second verification data 501. Second verification data generating unit 106 then outputs the generated second verification data 501 to data sending unit 103 (Step S1203).

Destination specifying unit 105 receives a specification of a broadcast group as e-mail destinations from the user, and searches broadcast group table 611 for the corresponding broadcast group ID 621. Destination specifying unit 105 then extracts destination IDs 622 associated with the target broadcast group ID 621 from broadcast group table 611 and outputs the extracted destination IDs 622 to data sending unit 103 (Step S1204).

Following this, data sending unit 103 combines first verification data 401, ciphertext 301, and second verification data 501, which have been respectively output from first verification data generating unit 104, encryption unit 102, and second verification data generating unit 106, in the stated order, to generate transmission data 601. Data sending unit 103 also receives the extracted destination IDs 622 from destination specifying unit 105, and then sends transmission data 601 to data receiving unit 111 of each message receiving device 110 specified by the destination IDs 622 (Step S1205).

Data receiving unit 111 receives transmission data 601 sent from data sending unit 103 and separates it into first verification data 701, ciphertext 702, and second verification data 703. Following this, data receiving unit 111 outputs the separated ciphertext 702 to decryption unit 114, the separated first verification data 701 to first verification unit 116, and the separated first verification data 701, the separated ciphertext 702, and the separated second verification data 703 to second verification unit 117 (Step S1206).

Decryption unit 114 decrypts the separated ciphertext 702 using a predetermined encryption algorithm and a predetermined secret key to generate decrypted plaintext 801. Decryption unit 114 then outputs the decrypted plaintext 801 to display unit 112 and first verification unit 116 (step S1207).

First verification unit 116 receives decrypted plaintext 801 outputted from decryption unit 114 and first verification data 701 outputted from data receiving unit 111, and performs hashing for decrypted plaintext 801 using the hash function SHA-1, which was used in first verification data generating unit 104, to generate third verification data 901. First verification unit 116 then compares the generated third verification data 901 with the received first verification data 701 and generates first verification result 1001 showing whether there is a match. First verification unit 116 then outputs first verification result 1001 to display unit 112 (Step S1208).

Second verification unit 117 receives first verification data 701, ciphertext 702, and second verification data 703 that have been output from data receiving unit 111. Second verification unit 117 then combines ciphertext 702 and first verification data 701 in the stated order, and performs hashing for the combination using the hash function SHA-1 to generate 20-byte hash data. Second verification unit 117 also verifies the received second verification data 703 by performing the MYELLTY signature verification algorithm using a predetermined public key, the generated hash data, and second verification data 703. Second verification unit 117 then generates second verification result 1002 showing whether second verification data 703 is correct, and outputs second verification result 1002 to display unit 112 (Step S1209).

Display unit 112 receives decrypted plaintext 801, first verification result 1001, and second verification result 1002 that have been output from decryption unit 114, first verification unit 116, and second verification unit 117, respectively (step S1210).

Following this, display unit 112 judges whether first verification result 1001 shows that there is a match (Step S1211), and if so, judges whether second verification result 1002 shows that second verification data 703 is correct (Step S1213). If so, display unit 112 displays decrypted plaintext 801 (Step S1215).

If display unit 112 judges that first verification result 1001 shows that there is a match (Step S1211) and that second verification result 1002 shows that second verification data 703 is incorrect (Step S1213), then display unit 112 displays an indication showing that the received data might have been changed during transmission on communication lines (Step S1214).

If display unit 112 judges that first verification result 1001 shows that there is no match (Step S1211) and that second verification result 1002 shows that second verification data 703 is correct (Step S1212), then display unit 112 displays a different indication showing that the wrong key was possibly used for decryption.

If display unit 112 judges that first verification result 1001 shows that there is no match (Step S1211) and that second verification result 1002 shows that second verification data 703 is correct (Step S1212), then display unit 112 displays a different indication showing that the wrong key was possibly used for decryption (Step S1216).

[Data Flow in E-mail Encryption System 120]

Figure 15:
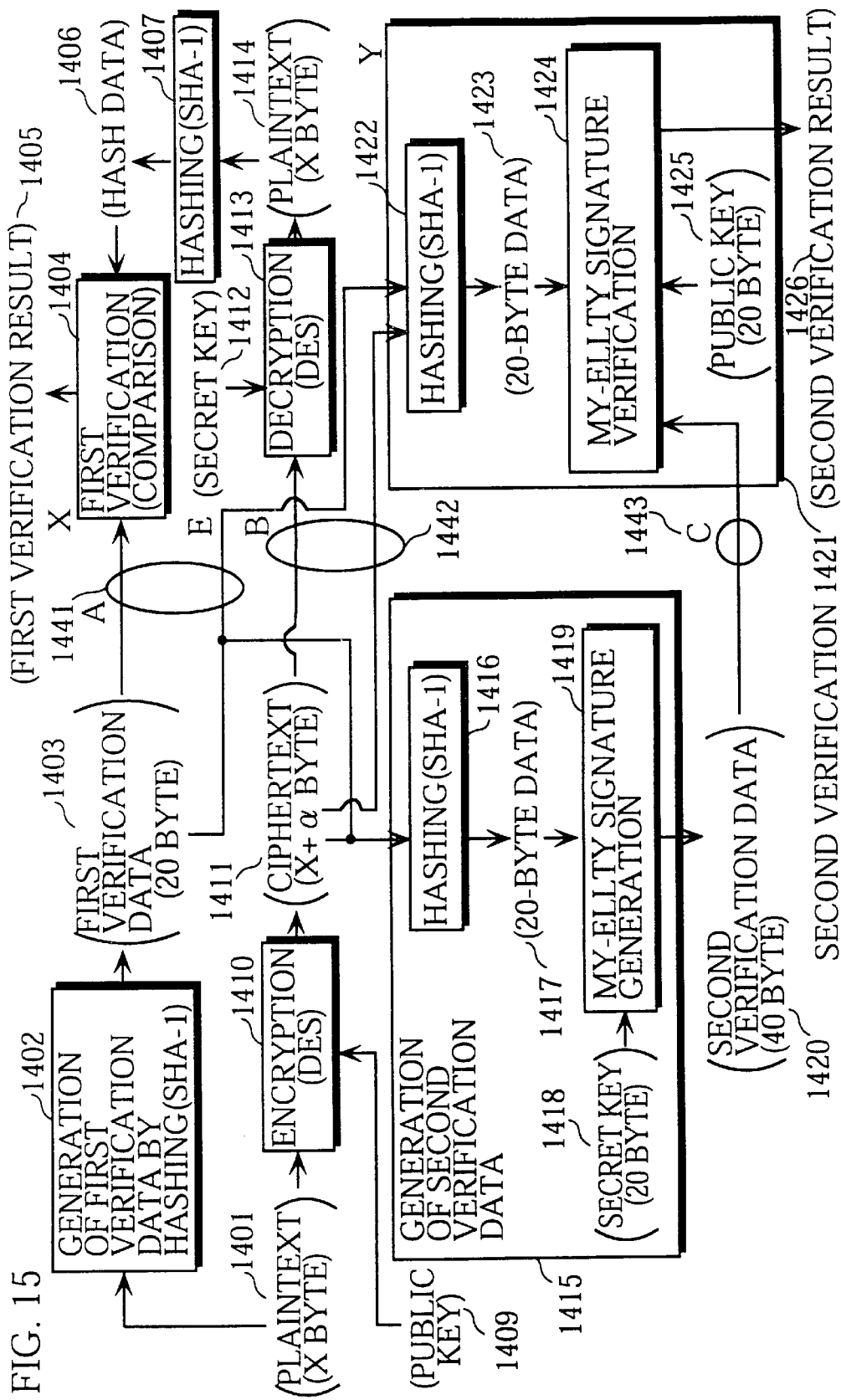
FIG. 15 shows a data flow of the e-mail encryption system shown in FIG. 2.

The following explains data flow in the e-mail encryption system 120 shown in FIG. 2, referring to FIG. 15.

In message sending device 100, first verification data 1403 is generated from plaintext 1401 using the hash function SHA-1 (1402), and ciphertext 1411 is generated from plaintext 1401 using the DES (Data Encryption Standard) encryption algorithm (1410). Also, 20-byte data 1417 is generated from first verification data 1403 and ciphertext 1411 using the hash function SHA-1 (1416), and second verification data 1420 is generated from the 20-byte data 1417 using the MYELLTY signature generation algorithm (1419).

In message receiving device 110, plaintext 1414 is generated from ciphertext 1411 using the DES decryption algorithm (1413), and hash data 1406 is generated from plaintext 1414 using the hash function SHA-1 (1407). The generated hash data 1406 is compared with first verification data 1403 so that first verification result 1405 is generated (1404). Also, 20-byte data 1423 is generated from first verification data 1403 and ciphertext 1411 using the hash function SHA-1 (1422), and second verification result 1426 is generated from the 20-byte data 1423 and second verification data 1420 using the MYELLTY signature verification algorithm (1424),

[Relation between Verification Result and Error Causes in E-mail Encryption System 120]

The following explains relation between verification results and error causes in the e-mail encryption system 120 shown in FIG. 2, referring to FIG. 16.

As shown in the table of FIG. 16, error causes 1601 are classified as follows: error cause A 1611 of first verification data changed or partly/wholly lost during transmission; error cause B 1612 of ciphertext changed or partly/wholly lost during transmission; error cause C 1613 of second verification data changed or partly/wholly lost during transmission; and error cause E 1614 of the use of a wrong key for decryption. Verification results 1602 of first verification result X 1615 and second verification result Y 1616 are provided for each possible combination of these error causes.

In the table, circles in the column of error causes 1601 show that corresponding error has not occurred, and crosses show that the error has occurred. Circles and crosses in the column of first verification result X 1615 show whether or not a match is found in the first verification. Circles and crosses in the column of second verification result Y 1616 show whether or not second verification data 703 is correct.

By referring to the table, it can be seen that when verifications of both first verification unit 116 and second verification unit 117 succeed, no errors have occurred. When the verification of first verification unit 116 fails whereas that of second verification unit 117 succeeds, errors A 1611 to C 1613 have not occurred, which means that first verification data 701, ciphertext 702, and second verification data 703 have been transmitted without errors. When the verifications of both first verification unit 116 and second verification unit 117 fail, an error has occurred for at least one set of data out of first verification data 701, ciphertext 702, and second verification data 703. When the verification of first verification unit 116 succeeds whereas that of second verification unit 117 fails, an error has occurred for only second verification data 703.

[Conclusion]

As has been described, when the verification of first verification unit 116 fails whereas that of second verification unit 117 succeeds, first verification data, ciphertext, and second verification data have been transmitted without errors. When the verifications of both first verification unit 116 and second verification unit 117 fail, an error has occurred during transmission for at least one set of data out of first verification data, ciphertext, and second verification data.

In this way, the above e-mail encryption system has an advantage of being capable of verifying whether encrypted communication has been performed without errors up to the step of "(b) transmission of a ciphertext and other data" in the encrypted communication steps of: (a) encryption of a plaintext; (b) transmission of a ciphertext and other data; (c) decryption of the ciphertext; and (d) verification of a decrypted plaintext.

It should be noted here that when verifications of both first verification unit 116 and second verification unit 117 succeed, this proves that decrypted ciphertext 801 is the same as plaintext 201.

The present invention has been explained based on the above embodiment, although the present invention is not limited to the above embodiment. Example modifications are given below.

[Modification-1]

With the e-mail encryption system described in the above embodiment, second verification data generating unit 106 combines ciphertext 301 outputted from decryption unit 102 and first verification data 401 outputted from first verification data generating unit 104 in the stated order, and performs hashing for the combination of ciphertext 301 and first verification data 401 using the hash function SHA-1 to generate 20-byte hash data. Then, for the generated hash data, the MYELLTY signature generation algorithm is performed using a predetermined secret key. As a result, second verification data 501 is generated and outputted to data sending unit 103. Second verification unit 117 receives first verification data 701, ciphertext 702, and second verification data 703 that have been output from data receiving unit 111, combines ciphertext 702 and first verification data 701 in the stated order, and performs hashing for the combination of ciphertext 702 and first verification data 701 using the hash function SHA-1 so that 20-byte hash data is generated. Following this, second verification unit 117 performs the MYELLTY signature verification algorithm using a predetermined public key, the hash data, and second verification data 703, and so verifies whether second verification data 703 is correct. Following this, second verification unit generates second verification result 1002 showing whether second verification data 703 is correct and outputs second verification result 1002 to display unit 112. Here, the processing of the above e-mail encryption system may be modified as follows.

Second verification data generating unit 106 performs hashing for ciphertext 301 outputted from encryption unit 102 by using the hash function SHA-1 to generate 20-byte hash data. Then, for the generated hash data, second verification data generating unit 106 performs the MYELLTY signature generation algorithm using a predetermined secret key to generate second verification data 501, which is output to data sending unit 103. Second verification unit 117 receives ciphertext 702 and second verification data 703 that have been output from data receiving unit 111, and performs hashing for ciphertext 702 using the hash function SHA-1 to generate 20-byte hash data. Following this, second verification unit 117 performs the MYELLTY signature verification algorithm using a predetermined public key, the hash data, and the second verification data 703, and so verifies whether second verification data 703 is correct. Following this, second verification unit 117 generates second verification result 1002 showing whether second verification data 703 is correct and outputs second verification result 1002 to display unit 112.

Figure 17:
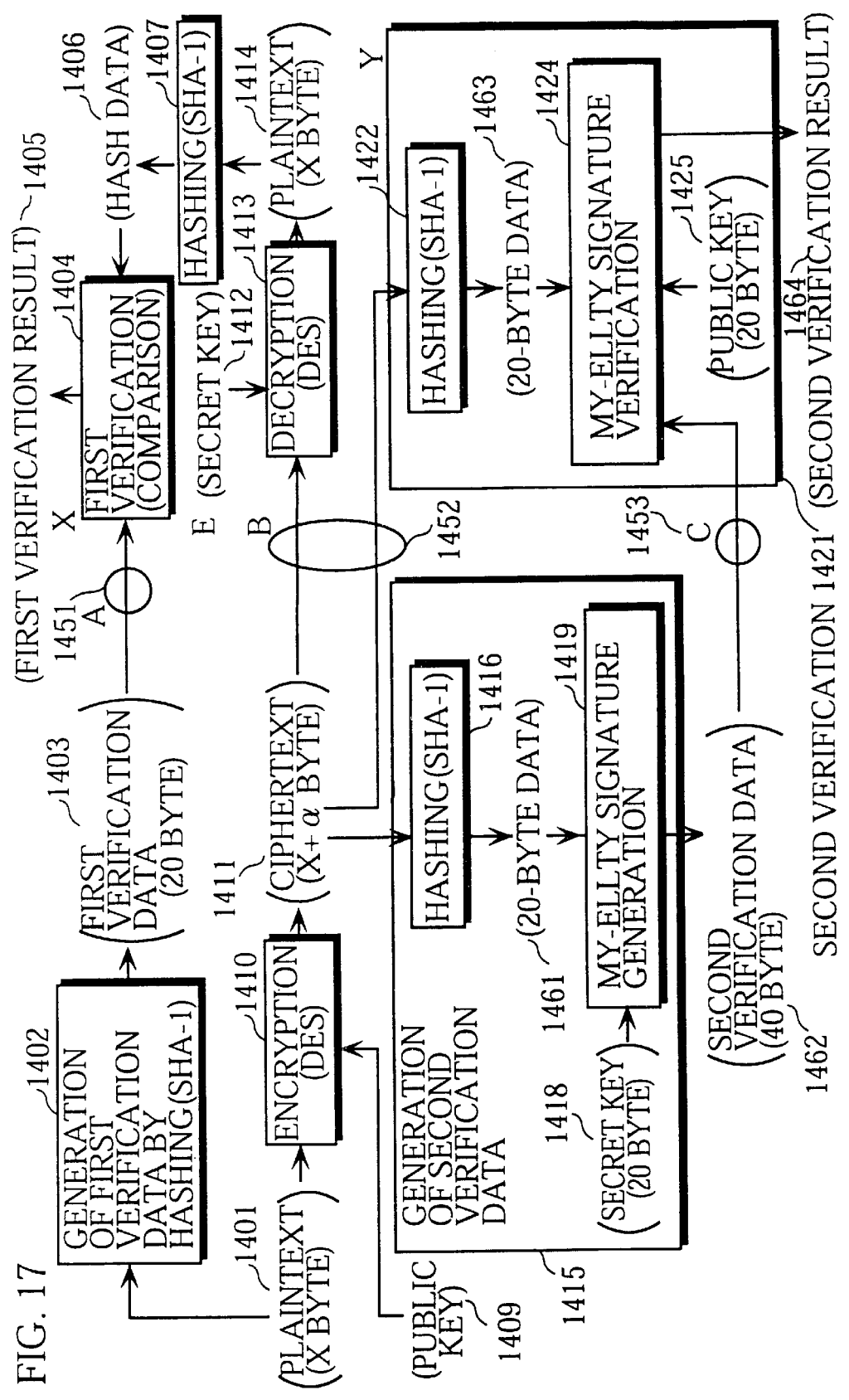

The following explains data flow in the e-mail encryption system described in the above modification, referring to FIG. 17.

In message sending device 100, first verification data 1403 is generated from plaintext 1401 using the hash function SHA-1 (1402), and ciphertext 1411 is generated from plaintext 1401 using the DES encryption algorithm (1410). Also, 20-byte data 1461 is generated from ciphertext 1411 using the hash function SHA-1 (1416), and second verification data 1462 is generated from the 20-byte data 1461 using the MYELLTY signature generation algorithm (1419).

In message receiving device 110, plaintext 1414 is generated from ciphertext 1411 using the DES decryption algorithm (1413), and hash data 1406 is generated from plaintext 1414 using the hash function SHA-1 (1407). The generated hash data 1406 is compared with first verification data 1403 so that first verification result 1405 is generated (1404). Also, 20-byte data 1463 is generated from ciphertext 1411 using the hash function SHA-1 (1422), and second verification result 1464 is generated from the 20-byte data 1463 and second verification data 1462 using the MYELLTY signature verification algorithm (1424).

The following explains the relation between verification result and error causes in the e-mail encryption system of the present modification, referring to FIG. 18.

As shown in the table of FIG. 18, error causes 1701 are classified as follows: error cause A 1711 of first verification data changed or partly/wholly lost during transmission; error cause B 1712 of ciphertext changed or partly/wholly lost during transmission; error cause C 1713 of second verification data changed or partly/wholly lost during transmission; and error cause E 1714 of the use of the wrong key for decryption. Verification results 1702 of first verification result X 1715 and second verification result Y 1716 are provided for each possible combination of these error causes.

In the table, circles in the column of error causes 1701 show that corresponding error has not occurred, and crosses show that the error has occurred. Here, it should be noted that errors during transmission on communication lines are unlikely to occur for first verification data 401 and second verification data 501, since sizes of these data are much smaller than ciphertext 301. Therefore, the columns of error causes A 1711 and C 1713 show circles only. Circles and crosses in the column of first verification result X 1715 show whether or not there has been a match in the first verification. Circles and crosses in the column of second verifications result Y 1716 show whether or not second verification data 703 is correct.

Provided that no errors have occurred for first verification data 401 and second verification data 501, the table shows the following. When the verifications of both first verification unit 116 and second verification unit 117 succeed, no errors have occurred. When the verification of first verification unit 116 fails whereas that of second verification unit 117 succeeds, error cause E 1714 is found, which means that a wrong secret key was used for decryption. When the verifications of both first verification unit 116 and second verification unit 117 fail, error cause B 1712 is always found, which means that an error has occurred for ciphertext 702.

[Modification-2]

The processing of the e-mail encryption system described in the embodiment may be modified as follows.

Second verification data generating unit 106 combines ciphertext 301 outputted from encryption unit 102 and first verification data 401 outputted from first verification data generating unit 104 in the stated order, and performs hashing for the combination using the hash function SHA-1 to generate 20-byte hash data which is second verification data 501. Second verification data generating unit 106 then outputs the generated second verification data 501 to data sending unit 103. Second verification unit 117 receives first verification data 701, ciphertext 702, and second verification data 703 that have been output from data receiving unit 111, combines ciphertext 702 and first verification data 701 in the stated order, and performs hashing for the combination using the hash function SHA-1 to generate 20-byte hash data. Following this, second verification unit 117 verifies, using the hash data and second verification data 703, whether second verification data 703 is correct. Second verification unit 117 then generates second verification result 1002 showing whether second verification data 703 is correct and outputs second verification result 1002 to display unit 112.

[Modification-3]

The processing of the e-mail encryption system described in the embodiment may be modified as follows.

Second verification data generating unit 106 performs hashing for ciphertext 301 outputted from encryption unit 102, using the hash function SHA-1 to generate 20-bit hash data which is second verification data 501. Second verification data generating unit 106 then outputs the generated second verification data 501 to data sending unit 103. Second verification unit 117 receives ciphertext 702 and second verification data 703 that have been output from data receiving unit 111, and performs hashing for ciphertext 702 using the hash function SHA-1 to generate 20-byte hash data. Following this, second verification unit 117 verifies, using the generated hash data and second verification data 703, whether second verification data 703 is correct. Second verification unit 117 then generates second verification result 1002 showing whether second verification data 703 is correct and outputs second verification result 1002 to display unit 112.

[Modification-4]

The processing of the e-mail encryption system described in the embodiment may be modified as follows.

First verification data generating unit 104 reads plaintext 201 from plaintext storage unit 101 and performs hashing for the read plaintext 201, using the hash function SHA-1 to generate 20-byte hash data. First verification data generating unit 104 also performs the MYELLTY signature generation algorithm for the read plaintext 201 to generate first verification data 701. Then, first verification data generating unit 104 outputs the generated first verification data 701 to data sending unit 103. First verification unit 116 receives decrypted plaintext 801 outputted from decryption unit 114 and first verification data 701 outputted from data receiving unit 111, and performs hashing for decrypted plaintext 801, using the hash function SHA-1 to generate 20-byte hash data. First verification unit 116 also performs, for the generated hash data and the received first verification data 701, the MYELLTY signature verification algorithm so that plaintext 201 is compared with decrypted plaintext 801 to judge whether there is a match. First verification unit 117 then generates first verification result 1001 showing whether there is a match and outputs first verification result 1001 to display unit 112.

[Other Modifications]

While the above embodiment and modifications 1–4 have been described as examples of achieving the effects of the invention, the present invention is not limited to such, but the following changes may be possible.

(a) In the above embodiment and modifications, the DES encryption/decryption algorithms are used for encryption and decryption, the hash function SHA-1 for hashing, and the MYELLTY algorithms for signature generation/verification as digital signature generation/verification algorithms, although other encryption/decryption methods, hashing methods, and digital signature generation/verification algorithms may be used.

(b) In the above embodiment and modifications, methods for specifying error causes when verifications of received encryption data fail have been explained based on an example when the methods are used by an e-mail encryption system, although these methods may be used by other systems that send and receive encrypted information such as a WWW (World Wide Web) encrypt system and an FTP (File Transfer Protocol) encryption system.

(c) Any combination of the techniques described in the embodiment and in the modifications may be used.

(d) The present invention may be embodied in an encryption and/or decryption methods realized by the procedures described in the embodiment and the modifications. Other embodiments may be a computer-readable recording medium storing an encryption program that has a computer execute the above encryption method and a computer-readable recording medium storing a decryption program that has a computer execute the above decryption method. Such encryption program and decryption program may also be transmitted via communication lines.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An encryption device that encrypts a plaintext to generate a ciphertext and outputs the ciphertext to a decryption device, comprising:

plaintext storage means for storing a plaintext;

first generating means for generating first verification data by performing a first message digest algorithm for the plaintext, the plaintext having been read from the plaintext storage means;

encryption means for encrypting the plaintext using a predetermined encryption algorithm to generate a ciphertext, the plaintext having been read from the plaintext storage means;

second generating means for generating second verification data by performing a second message digest algorithm for a combination of the first verification data and the ciphertext; and data outputting means for outputting the ciphertext, the first verification data, and the second verification data to the decryption device.

2. The encryption device of claim 1, wherein the first message digest algorithm is a first hashing algorithm and the first verification data is hash data of a predetermined length and wherein the second message digest algorithm is a second hashing algorithm and the second verification data is hash data of a predetermined length.

3. The encryption device of claim 1, wherein the first generating means has a digital signature generation algorithm in addition to the first message digest algorithm, and generates first verification data by performing the first message digest algorithm for the plaintext to produce a message digest and then performing the digital signature generation algorithm for the message digest.

4. The encryption device of claim 1, wherein the second generating means has a digital signature generation algorithm in addition to the second message digest algorithm, and generates second verification data by performing the second message digest algorithm for the combination of the first verification data and the ciphertext to produce a message digest and then performing the digital signature generation algorithm for the message digest.

5. The encryption device of claim 1 wherein the encryption means encrypts the plaintext by further using an encryption key from one of a plurality of keys with the predetermined encryption algorithm to generate the ciphertext and the data outputting means outputs the ciphertext, the first verification data and the second verification data in a format to permit the decryption device to separate the ciphertext, the first verification data and the second verification data to enable determinations of whether the proper encryption key was used and whether the ciphertext, the first verification data and the second verification data had an error in transmission to the decryption device.

6. The encryption device of claim 5 wherein the first verification data is generated to enable a possible determination of an error in the encryption key.

7. The encryption device of claim 5 wherein the second verification data is generated to enable a possible determination of an error in the transmission of the ciphertext, the first verification data and the second verification data.

8. An encryption device that encrypts a plaintext to generate a ciphertext and outputs the ciphertext to a decryption device, comprising:

- plaintext storage means for storing a plaintext;
- first generating means for generating first verification data by performing a first message digest algorithm for the plaintext, the plaintext having been read from the plaintext storage means;
- encryption means for encrypting the plaintext using a predetermined encryption algorithm to generate a ciphertext, the plaintext having been read from the plaintext storage means;
- second generating means for generating second verification data by performing a second message digest algorithm for the ciphertext; and
- data outputting means for outputting the ciphertext, the first verification data, and the second verification data to the decryption device.

9. The encryption device of claim 8, wherein the second generating means has a digital signature generation algorithm in addition to the second message digest algorithm, and generates second verification data by performing the second message digest algorithm for the ciphertext to produce a message digest and then performing the digital signature generation algorithm for the message digest.

10. A decryption device that decrypts a ciphertext outputted from an encryption device, comprising:

- data receiving means for receiving the ciphertext, first verification data, and second verification data that have been outputted from the encryption device,
- wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for a combination of the first verification data and the ciphertext;
- decryption means for decrypting the received ciphertext using a decryption algorithm that decrypts ciphertexts encrypted by the predetermined encryption algorithm to generate a decrypted plaintext;
- first generating means for generating third verification data by performing an algorithm corresponding to the first message digest algorithm for the decrypted plaintext;
- first verification means for verifying the received first verification data using the third verification data;
- second generating means for generating fourth verification data by performing an algorithm corresponding to the second message digest algorithm for a combination of the received first verification data and the received ciphertext;
- second verification means for verifying the received second verification data using the fourth verification data; and
- outputting means for outputting results of the first verification means and the second verification means.

11. The decryption device of claim 10,

- wherein the first message digest algorithm is a first hashing algorithm, and the second message digest algorithm is a second hashing algorithm and
- wherein the third verification data and the fourth verification data are hash data of predetermined lengths.

12. The decryption device of claim 10,

- wherein the first verification means verifies the received first verification data using the third verification data according to a digital signature verification algorithm that verifies a signature made by a digital signature generation algorithm,
- wherein the first verification data is generated by performing the first message digest algorithm for the plaintext to produce a message digest and then performing the digital signature generation algorithm for the message digest.

13. The decryption device of claim 10,

- wherein the second verification means verifies the received second verification data using the fourth verification data according to a digital signature verification algorithm that verifies a signature made by a digital signature generation algorithm and
- wherein the second verification data is generated by performing the second message digest algorithm for the combination of the first verification data and the ciphertext to produce a message digest and then performing the digital signature generation algorithm for the message digest.

14. The decryption device of claim 10 wherein ciphertext has been generated by using an encryption key from one of a plurality of keys and the first verification means can enable the outputting means to determine an error in the encryption key.

15. The decryption device of claim 14 wherein the data outputting means is enabled by the first verification means and the second verification means to determine an error in the transmission of the ciphertext, the first verification data and the second verification data.

16. A decryption device that decrypts a ciphertext outputted from an encryption device, comprising:

- data receiving means for receiving the ciphertext, first verification data, and second verification data that have been outputted from the encryption device,
- wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for the ciphertext;
- decryption means for decrypting the received ciphertext using a decryption algorithm that decrypts ciphertexts encrypted by the predetermined encryption algorithm to generate a decrypted plaintext;
- first generating means for generating third verification data by performing an algorithm corresponding to the first message digest algorithm for the decrypted plaintext;
- first verification means for verifying the received first verification data using the third verification data;
- second generating means for generating fourth verification data by performing an algorithm corresponding to the second message digest algorithm for the received ciphertext;

second verification means for verifying the received second verification data using the fourth verification data; and outputting means for outputting results of the first verification means and the second verification means.

17. A decryption device that decrypts a ciphertext outputted from an encryption device, comprising:

data receiving means for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for the ciphertext to produce a message digest and then performing a digital signature generation algorithm for the message digest;

decryption means for decrypting the received ciphertext using a decryption algorithm that decrypts ciphertexts encrypted by the predetermined encryption algorithm to generate a decrypted plaintext;

first generating means for generating third verification data by performing an algorithm corresponding to the first message digest algorithm for the decrypted plaintext;

first verification means for verifying the received first verification data using the third verification data;

second generating means for generating fourth verification data by performing an algorithm corresponding to the second message digest algorithm for the received ciphertext;

second verification means for verifying the received second verification data using the fourth verification data according to a digital signature verification algorithm that verifies a signature made by the digital signature generation algorithm; and outputting means for outputting results of the first verification means and the second verification means.

18. A cryptography system that comprises an encryption device and a decryption device, wherein the encryption device comprises:

plaintext storage means for storing a plaintext;

first generating means for generating first verification data by performing a first message digest algorithm for the plaintext, the plaintext having been read from the plaintext storage means;

encryption means for encrypting the plaintext using a predetermined encryption algorithm to generate a ciphertext, the plaintext having been read from the plaintext storage means;

second generating means for generating second verification data by performing a second message digest algorithm for a combination of the first verification data and the ciphertext; and data outputting means for outputting the ciphertext, the first verification data, and the second verification data to the decryption device, and wherein the decryption device comprises:

data receiving means for receiving the ciphertext, the first verification data, and the second verification data that have been outputted from the encryption device;

decryption means for decrypting the received ciphertext using a decryption algorithm that decrypts ciphertexts encrypted by the predetermined encryption algorithm to generate a decrypted plaintext;

third generating means for generating third verification data by performing an algorithm corresponding to the first message digest algorithm for the decrypted plaintext;

first verification means for verifying the received first verification data using the third verification data;

fourth generating means for generating fourth verification data by performing an algorithm corresponding to the second message digest algorithm for a combination of the received first verification data and the received ciphertext;

second verification means for verifying the received second verification data using the fourth verification data; and outputting means for outputting results of the first verification means and the second verification means.

19. An encryption method used by an encryption device that has plaintext storage means for storing a plaintext, encrypts the plaintext to generate a ciphertext, and outputs the ciphertext to a decryption device, comprising:

a first generating step for generating first verification data by performing a first message digest algorithm for the plaintext, the plaintext having been read from the plaintext storage means;

an encryption step for encrypting the plaintext using a predetermined encryption algorithm to generate the ciphertext, the plaintext having been read from the plaintext storage means;

a second generating step for generating second verification data by performing a second message digest algorithm for a combination of the first verification data and the ciphertext; and a data outputting step for outputting the ciphertext, the first verification data, and the second verification data to the decryption device.

20. A decryption method used by a decryption device that decrypts a ciphertext outputted from an encryption device, comprising:

a data receiving step for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for a combination of the first verification data and the ciphertext;

a decryption step for decrypting the received ciphertext using a decryption algorithm that decrypts ciphertexts encrypted by the predetermined encryption algorithm to generate a decrypted plaintext;

a first generating step for generating third verification data by performing an algorithm corresponding to the first message digest algorithm for the decrypted plaintext;

a first verification step for verifying the received first verification data using the third verification data;

a second generating step for generating fourth verification data by performing an algorithm corresponding to the second message digest algorithm for a combination of the received first verification data and the received ciphertext;

a second verification step for verifying the received second verification data using the fourth verification data; and an outputting step for outputting results of the first verification step and the second verification step.

21. A computer-readable recording medium storing a program that has a computer encrypt a plaintext to generate a a ciphertext and output the ciphertext to a decryption device, wherein the computer includes plaintext storage means for storing a plaintext and wherein the program comprises:

a first generating step for generating first verification data by performing a first message digest algorithm for the plaintext, the plaintext having been read from the plaintext storage means;

an encryption step for encrypting the plaintext using a predetermined encryption algorithm to generate a ciphertext, the plaintext having been read from the plaintext storage means;

a second generating step for generating second verification data by performing a second message digest algorithm for a combination of the first verification data and the ciphertext; and a data outputting step for outputting the ciphertext, the first verification data, and the second verification data to the decryption device.

22. The computer-readable recording medium of claim 21, wherein the first generating step has a digital signature generation algorithm in addition to the first message digest algorithm, and generates first verification data by performing the first message digest algorithm for the plaintext to produce a message digest and then performing the digital signature generation algorithm for the message digest.

23. The computer-readable recording medium of claim 21, wherein the second generating step has a digital signature generation algorithm in addition to the second message digest algorithm, and generates second verification data by performing the second message digest algorithm for the combination of the first verification data and the ciphertext to produce a message digest and then performing the digital signature generation algorithm for the message digest.

24. A computer-readable recording medium storing a program that has a computer encrypt a plaintext to generate a ciphertext and output the ciphertext to a decryption device, wherein the computer includes plaintext storage means for storing a plaintext and wherein the program comprises:

a first generating step for generating first verification data by performing a first message digest algorithm for the plaintext, the plaintext having been read from the plaintext storage means;

an encryption step for encrypting the plaintext using a predetermined encryption algorithm to generate a ciphertext, the plaintext having been read from the plaintext storage means;

a second generating step for generating second verification data by performing a second message digest algorithm for the ciphertext; and a data outputting step for outputting the ciphertext, the first verification data, and the second verification data to the decryption device.

25. The computer-readable recording medium of claim 24, wherein the second generating step has a digital signature generation algorithm in addition to the second message digest algorithm, and generates second verification data by performing the second message digest algorithm for the ciphertext to produce a message digest and then performing the digital signature generation algorithm for the message digest.

26. A computer-readable recording medium storing a program that has a computer decrypt a ciphertext outputted from an encryption devicer wherein the program comprises:

a data receiving step for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for a combination of the first verification data and the ciphertext;

a decryption step for decrypting the received ciphertext using a decryption algorithm that decrypts ciphertexts encrypted by the predetermined encryption algorithm to generate a decrypted plaintext;

a first generating step for generating third verification data by performing an algorithm corresponding to the first message digest algorithm for the decrypted plaintext;

a first verification step for verifying the received first verification data using the third verification data;

a second generating step for generating fourth verification data by performing an algorithm corresponding to the second message digest algorithm for a combination of the received first verification data and the received ciphertext;

a second verification step for verifying the received second verification data using the fourth verification data; and an outputting step for outputting results of the first verification step and the second verification step.

27. The computer-readable recording medium of claim 26, wherein the first verification step verifies the received first verification data using the third verification data according to a digital signature verification algorithm that verifies a signature made by a digital signature generation algorithm, wherein the first verification data is generated by performing the first message digest algorithm for the plaintext to produce a message digest and then performing the digital signature generation algorithm for the message digest.

28. The computer-readable recording medium of claim 26, wherein the second verification step verifies the received second verification data using the fourth verification data according to a digital signature verification algorithm that verifies a signature made by a digital signature generation algorithm and wherein the second verification data is generated by performing the second message digest algorithm for the combination of the first verification data and the ciphertext to produce a message digest and then performing the digital signature generation algorithm for the message digest.

29. A computer-readable recording medium storing a program that has a computer decrypt a ciphertext outputted from an encryption device, wherein the program comprises:

a data receiving step for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for the ciphertext;

a decryption step for decrypting the received ciphertext using a decryption algorithm that decrypts ciphertexts encrypted by the predetermined encryption algorithm to generate a decrypted plaintext;

a first generating step for generating third verification data by performing an algorithm corresponding to the first message digest algorithm for the decrypted plaintext;

a first verification step for verifying the received first verification data using the third verification data;

a second generating step for generating fourth verification data by performing an algorithm corresponding to the second message digest algorithm for the received ciphertext;

a second verification step for verifying the received second verification data using the fourth verification data; and an outputting step for outputting results of the first verification step and the second verification step.

30. A computer-readable recording medium storing a program that has a computer decrypt a ciphertext outputted from an encryption device, wherein the program comprises:

a data receiving step for receiving the ciphertext, first verification data, and second verification data that have been outputted from the encryption device, wherein the ciphertext is generated by encrypting a plaintext using a predetermined encryption algorithm, wherein the first verification data is generated by performing a first message digest algorithm for the plaintext, and wherein the second verification data is generated by performing a second message digest algorithm for the ciphertext to produce a message digest and then performing a digital signature generation algorithm for the message digest;

a decryption step for decrypting the received ciphertext using a decryption algorithm that decrypts ciphertexts encrypted by the predetermined encryption algorithm to generate a decrypted plaintext;

a first generating step for generating third verification data by performing an algorithm corresponding to the first message digest algorithm for the decrypted plaintext;

a first verification step for verifying the received first verification data using the third verification data;

a second generating step for generating fourth verification data by performing an algorithm corresponding to the second message digest algorithm for the received ciphertext;

a second verification step for verifying the received second verification data using the fourth verification data according to a digital signature verification algorithm that verifies a signature made by the digital signature generation algorithm; and an outputting step for outputting results of the first verification step and the second verification step.

31. A cryptography system that comprises an encryption device and a decryption device, wherein the encryption device comprises:

plaintext storage unit for storing a plaintext;

first generating unit for generating first verification data by performing a first message digest algorithm for the plaintext, the plaintext having been read from the plaintext storage unit;

encryption unit for encrypting the plaintext using a predetermined encryption algorithm to generate a ciphertext and one of a plurality of encryption keys, the plaintext having been read from the plaintext storage unit;

second generating unit for generating second verification data by performing a second message digest algorithm for a combination of the first verification data and the ciphertext; and data outputting unit for outputting the ciphertext, the first verification data, and the second verification data to the decryption device, and wherein the decryption device comprises:

data receiving unit for receiving the ciphertext, the first verification data, and the second verification data that have been outputted from the encryption device;

decryption unit for decrypting the received ciphertext using a decryption algorithm that decrypts ciphertexts encrypted by the predetermined encryption algorithm to generate a decrypted plaintext;

third generating unit for generating third verification data by performing an algorithm corresponding to the first message digest algorithm for the decrypted plaintext;

first verification unit for verifying the received first verification data using the third verification data;

fourth generating unit for generating fourth verification data by performing an algorithm corresponding to the second message digest algorithm for a combination of the received first verification data and the received ciphertext;

second verification unit for verifying the received second verification data using the fourth verification data; and outputting unit for processing the results of the first verification means and the second verification means to diagnose if an error has occurred and a possible source of the error.

32. The cryptography system of claim 31 wherein the outputting unit is enabled by the results of first verification means to determine an error in the selection of the encryption key used out of the plurality of encryption keys.

33. The cryptography system of claim 32 wherein the outputting unit is enabled by the results of the second verification means to determine an error in the transmission of the ciphertext, the first verification data and second verification data from the encryption device.

34. The cryptography system of claim 31 wherein the outputting unit provides a diagnostic evaluation that upon verification of the first verification data and the failure of the verification of the second verification data a first output of an indication that transmission of the ciphertext has been performed without an error while transmission of the first verification data includes an error, and upon a failure of verification of the first verification data and a verification of the second verification data a second output of an indication that the ciphertext has been transmitted without error while an error has occurred in generation of the ciphertext.

* * * * *

UNITED STATES PATENT AND TRADEMARK OFFICE
CERTIFICATE OF CORRECTION

PATENT NO. : 6,523,115 B1
DATED : February 18, 2003
INVENTOR(S) : Takatoshi Ono

It is certified that error appears in the above-identified patent and that said Letters Patent is hereby corrected as shown below:

Column 21,
Line 8, please delete the extra word "a" (second occurrence).

Column 22,
Line 9, please delete the word "devicer" and insert -- device, --.

Signed and Sealed this

Twenty-ninth Day of November, 2005

JON W. DUDAS
*Director of the United States Patent and Trademark Office*